United States Patent [19]

Fujii et al.

[11] 4,115,181
[45] Sep. 19, 1978

[54] APPARATUS FOR PREPARING MULTI-LAMINATED SHEET

[75] Inventors: Hideo Fujii, Yokohama; Tokio Fujiki, Yamato; Masaru Uemura, Tokyo; Masakazu Sakura, Yokohama, all of Japan

[73] Assignee: Toyo Soda Manufacturing Co., Ltd., Japan

[21] Appl. No.: 763,628

[22] Filed: Jan. 28, 1977

[30] Foreign Application Priority Data

Feb. 6, 1976 [JP] Japan ................. 51-011306
Oct. 22, 1976 [JP] Japan ................. 51-126278
Oct. 22, 1976 [JP] Japan ................. 51-126284

[51] Int. Cl.² .................. B29D 7/02; B32B 31/26
[52] U.S. Cl. ........................ 156/497; 156/498; 156/499; 156/500
[58] Field of Search ............. 156/244, 497, 498, 499, 156/500, 501, 311; 425/114

[56] References Cited

U.S. PATENT DOCUMENTS

| | | | |
|---|---|---|---|
| 2,968,576 | 1/1961 | Keller et al. | 156/497 |
| 3,380,876 | 4/1968 | Rusher | 156/244 |
| 3,459,625 | 8/1969 | Heller et al. | 156/500 |
| 3,514,362 | 5/1970 | Chavannes | 156/499 |
| 3,570,748 | 5/1971 | Coyle et al. | 156/244 |
| 3,616,191 | 10/1971 | Fuerholzer et al. | 156/244 |
| 3,749,629 | 7/1973 | Andrews et al. | 156/244 |
| 3,876,452 | 4/1975 | Anspon et al. | 156/244 |

FOREIGN PATENT DOCUMENTS

| | | | |
|---|---|---|---|
| 7,330,476 | 1973 | Japan | 156/498 |
| 7,103,071 | 1971 | Netherlands | 156/244 |

*Primary Examiner*—Caleb Weston
*Attorney, Agent, or Firm*—Oblon, Fisher, Spivak, McClelland & Maier

[57] ABSTRACT

An apparatus for preparing multi-laminated sheets comprises a first sheet feeding unit, an adhesive coating unit, a drying unit, a second sheet feeding unit, a superposing unit, a molten film extruding unit, a press-bonding unit and a take-up winding unit.

In the drying unit, an uncoated surface of the first sheet coated with the adhesive composition is contacted with a cooling roller and a plurality of hot air nozzles are arranged to face to the coated surface of the first sheet and the nozzles and the cooling roller are covered with a cover having an outlet of the gas whereby the adhesive composition coated on the first sheet is dried with hot air under cooling the back surface of the first sheet.

4 Claims, 4 Drawing Figures

APPARATUS FOR PREPARING MULTI-LAMINATED SHEET

BACKGROUND OF THE INVENTION

1. Field of the Invention

The present invention relates to an apparatus for preparing multi-laminated sheets without disordering an inner layer by a simple operation.

2. Description of the Prior Art

Recently, various types of multi-laminated sheets have been prepared to satisfy needs of high quality products in various packaging fields, plastic and paper making fields.

Various multi-laminated sheets are known which have each an inner layer comprising a fiber or a net, a plastic, etc..

In order to prepare these multi-laminated sheets, the following two step methods have been employed.

A two layer laminated sheet is prepared in the first step and then, the third layer is formed on the two layer laminated sheet in the second step.

A second layer is superposed on a first sheet and they are fed to an adhesive coating step and a drying step and then, they are press-bonded with a third sheet between a compressing roller and a cooling roller to form the multi-laminated sheet.

In the former method, the complicated steps in low efficiency are needed and a large size apparatus as the line is needed disadvantageously.

In the latter method, the coating of the adhesive composition is not uniform and the disorder of a cloth, net or yarns as the second layer is disordered disadvantageously.

Moreover, there was the disadvantages to dry a coated adhesive composition on the first sheet without a damage of the first sheet.

SUMMARY OF THE INVENTION

It is an object of the present invention to provide an apparatus for preparing a multi-laminated sheet having a uniform inner layer in a simple step without a trouble.

The apparatus for preparing a multi-laminated sheet of the present invention comprises a first sheet feeding unit, an adhesive coating unit, a drying unit, a second sheet feeding unit, a superposing unit, a molten film extruding unit, a press-bonding unit and a take-up winding unit.

The drying unit comprises a cooling drum and hot air nozzles arranged to face to the cooling drum and a cover thereby cooling the back surface of the first sheet under blowing hot air on the adhesive coated surface through the hot air nozzles.

DETAILED DESCRIPTION OF THE PREFERRED EMBODIMENTS

Figure 1:
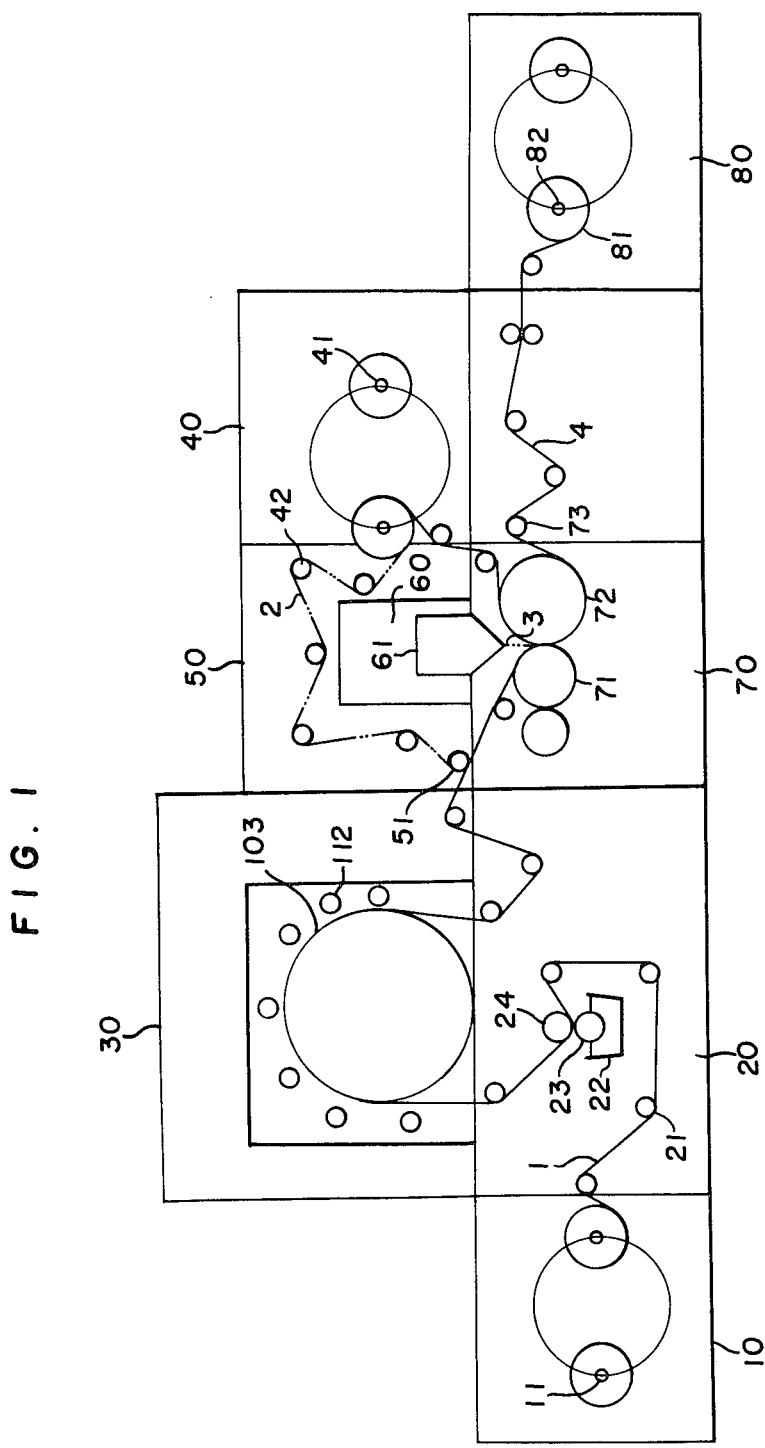
FIG. 1 is a schematic view of a blocked apparatus for preparing multi-laminated sheets according to the present invention.

Various objects features and advantages of the present invention will be more fully appreciated as the same becomes better understood from the following description when considered in connection with the accompanying drawings, in which like reference numerals designate like or corresponding parts throughout the views.

Referring to FIG. 1, one embodiment of the apparatus for preparing multi-laminated sheets according to the present invention.

In FIG. 1, the reference numeral 10 designates a first sheet feeding unit; 20 designates an adhesive coating unit; 30 designates a drying unit; 40 designates a second sheet feeding unit; 50 designates a superposing unit; 60 designates a molten film extruding unit; 70 designates a press-bonding unit; and 80 designates a take-up winding unit for the multi-laminated sheet. It is possible to arrange a trimming unit as one block between 70 and 80.

In the first sheet feeding unit 10, the first sheet is held on a shaft 11.

The adhesive coating unit 20 comprises guide rollers 21 for guiding the first sheet 1, an adhesive vessel 22 filled with an adhesive composition, a roller 23 for coating the adhesive composition and a pressing roller 24 for pressing the first sheet 1. The roller 23 can be gravure or smooth roller.

The drying unit 30 comprises a rotary drum 103 for feeding the first sheet 1 and a plurality of nozzles 112 for blowing hot air to dry the adhesive composition.

The adhesive coated first sheet which is dried, is fed through guide roller 51 and the superposing unit 50 to the press-bonding unit 70.

The adhesive coating unit 20 and the adhesive drying unit 30 are not always necessary and are set when an adhesive composition is coated.

On the other hand, the second sheet 2 is held on a shaft 41. The second sheet 2 is fed through guide roller 42 to a guide roller 51 in the superposing unit 50 wherein the second sheet 2 is superposed to the first sheet 1.

The third sheet of the molten film 3 is extruded from the extruding unit 60 which is a conventional extruder. A T-die 61 is disposed above the gap between a pressing roller 71 and a chill roller 72 in the press-bonding unit 70.

Thus, the first sheet 1, the second sheet 2 and the third sheet of the molten film 3 are fed between the pressing roller 71 and the chill roller 72 and they are press-bonded and cooled between the rollers.

The multi-laminated sheet 4 formed by press-bonding them, is guided through a guide roller 73 to the take-up winding unit 80 and is taken up on a bobbin 81 held on a shaft 82.

In accordance with the embodiment, the multi-laminated sheet can be easily prepared in one laminated step without a loss by setting the second sheet feeding unit to the two layer laminated sheeting apparatus.

The second sheet of cloth, net or yarns which is sandwiched between the first sheet and the molten film of the third sheet can be firmly adhered without disordering the desired shape of the cloth, net or yarns whereby the multi-laminated sheet having high strength can be obtained.

In the invention, suitable first sheet 1 include paper, fabric, nonwoven fabric, and plastic film or plate made of polyolefin, cellulose, nylon or polyester and metallic foil, etc..

Suitable second sheets 2 include yards, slitted cloth, nonwoven cloth, woven cloth, tape, plastic cloth and net, etc.. Two or more can be combined. The first sheet can also be used as the second sheet.

Suitable third sheets are the molten films extruded from the extruder through the T-die and are made of polyolefin such as polyethylene, polypropylene or a copolymer of ethylene and other comonomer such as ethylene-vinyl acetate copolymer.

Suitable adhesive compositions include polyethyleneimine type adhesives, polyurethane type adhesives, organotitanate type adhesives, polyester type adhesives or modified adhesives which are usually used by dissolving in water or a desired organic solvent such as ethyl acetate, toluene, methylethyl ketone, n-hexane, methanol to form a solution thereof. Suitable concentration of the adhesive component is in a range of 0.3 to 30 wt. %.

The pressure between the pressing roller 71 and the cooling roller 72 is usually in a range of 5 to 30 Kg/cm.

The running velocity of the first and second sheets is usually in a range of 10 to 200 m/min..

The following is one example for preparing the multi-laminated sheet.

First sheet: paper (high quality ) width 500 mm; thickness 50 g/m$^2$
Second sheet: slitted cloth
Third molten film: low density polyethylene (M.I. 8g/10 min.: density 0.917 g/cc)
thickness 20$\mu$
screw revolution velocity 80 rpm
temperature in extrusion 310° C.

These three sheets were press-bonded at a rate of 70 m/min. by the apparatus whereby three layer laminated sheet having excellent adhesive strength was obtained.

The slitted cloth of the second sheet which is sandwiched between the first and third sheets, is not disordered. The resulting multi-laminated sheet has heat sealing property.

In the drying unit, water or the organic solvent used in the adhesive composition coated on the first sheet is removed.

It has been known to use a drying unit wherein a sheet coated with an adhesive composition is fed on guide rollers arranged in a chamber and a large volume of hot air is blown into the chamber to remove water or the organic solvent.

In the unit, the temperature for drying the adhesive composition coated on the sheet should be higher than a boiling pont of water or the organic solvent, and the sheet itself is heated to the same temperature. The sheet made of thermoplastic resin is shrunk to cause creases in the resulting laminated sheet. The value of the product is lowered.

If a volume of the hot air is reduced or the temperature of the hot air is lowered for preventing the formation of creases, water or the organic solvent in the adhesive composition is not removed as desired whereby the adhesive strength between layers is lowered and the smell of the adhesive composition is remained to deteriorate the quality of the content in a package.

In order to overcome the disadvantage, the adhesive drying unit is improved as follows.

The drying unit comprises a rotary drum for running the sheet, a coolant path for cooling the drum and a plurality of nozzles for blowing hot air which are arranged to face to the surface of the rotary drum. A plurality of guide rollers can be arranged on the surface of the rotary drum.

Figure 2:
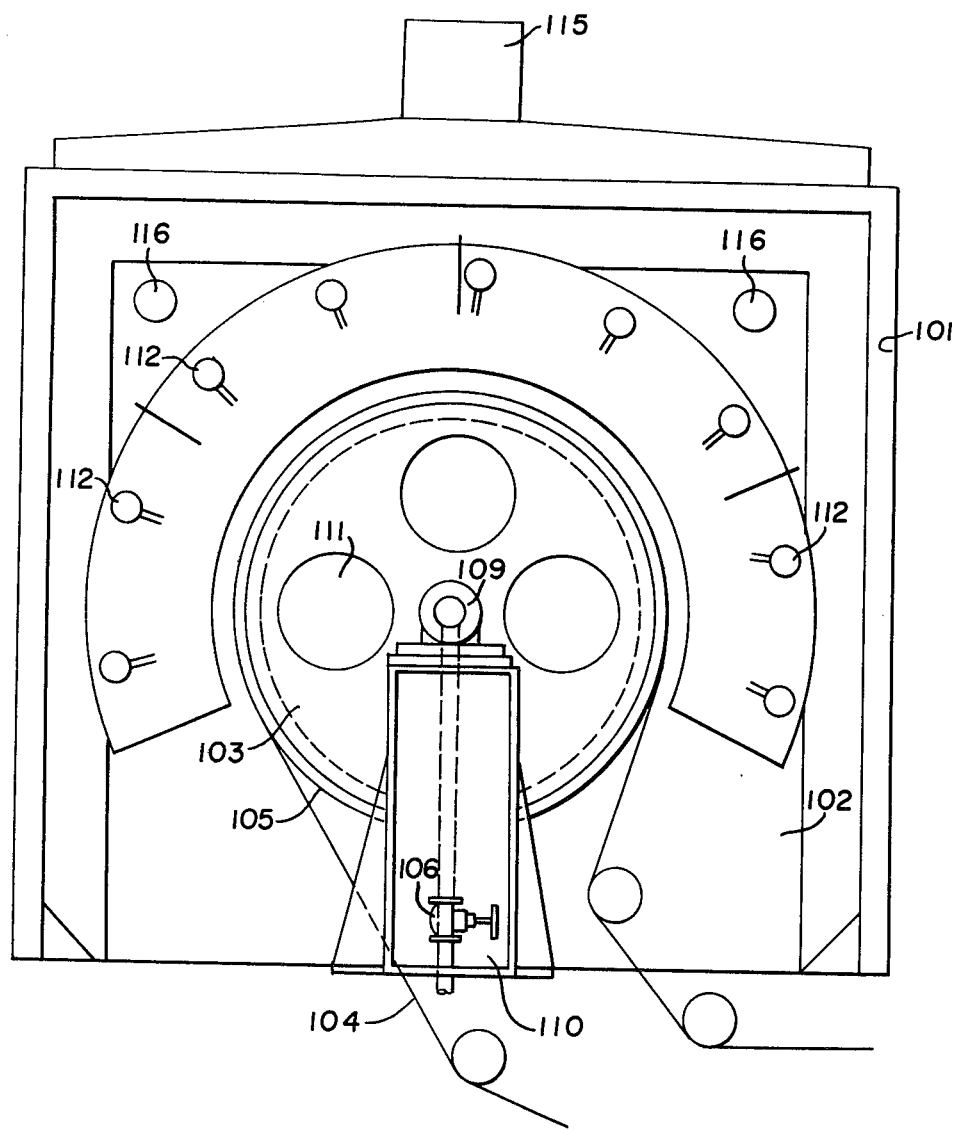
FIG. 2 is a schematic sectional front view of a drying unit used in the apparatus of the invention.
Figure 3:
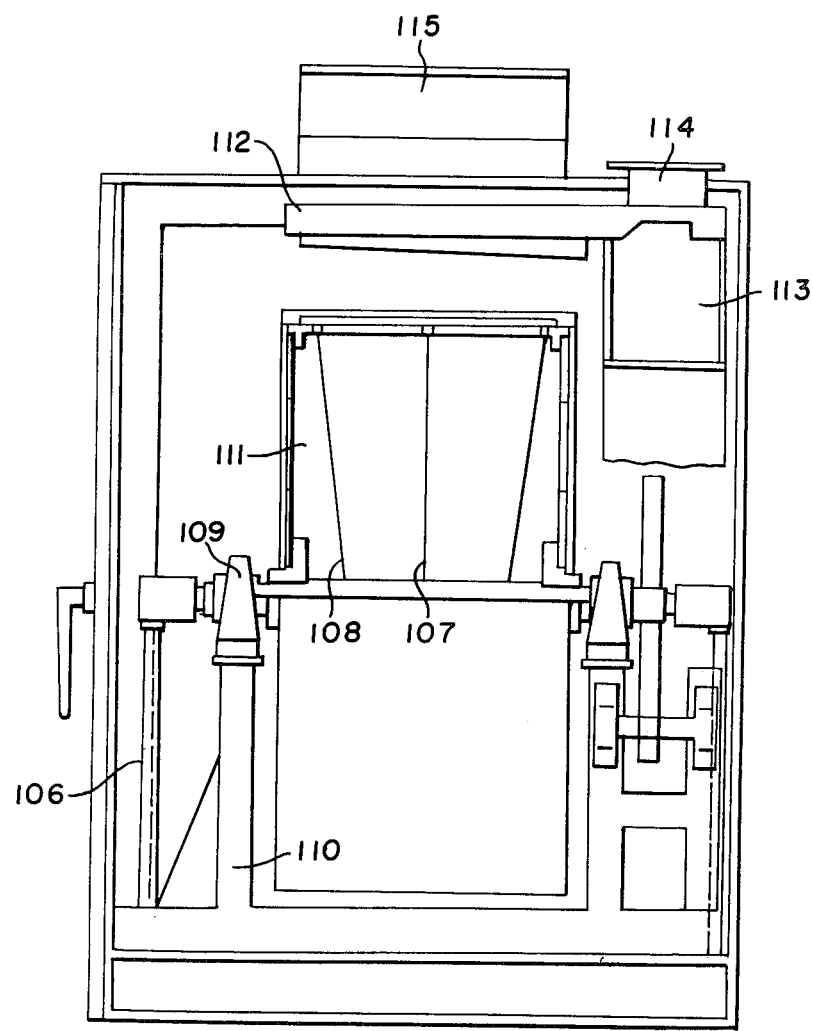
FIG. 3 is a schematic side view of the drying unit of FIG. 2.
Figure 4:
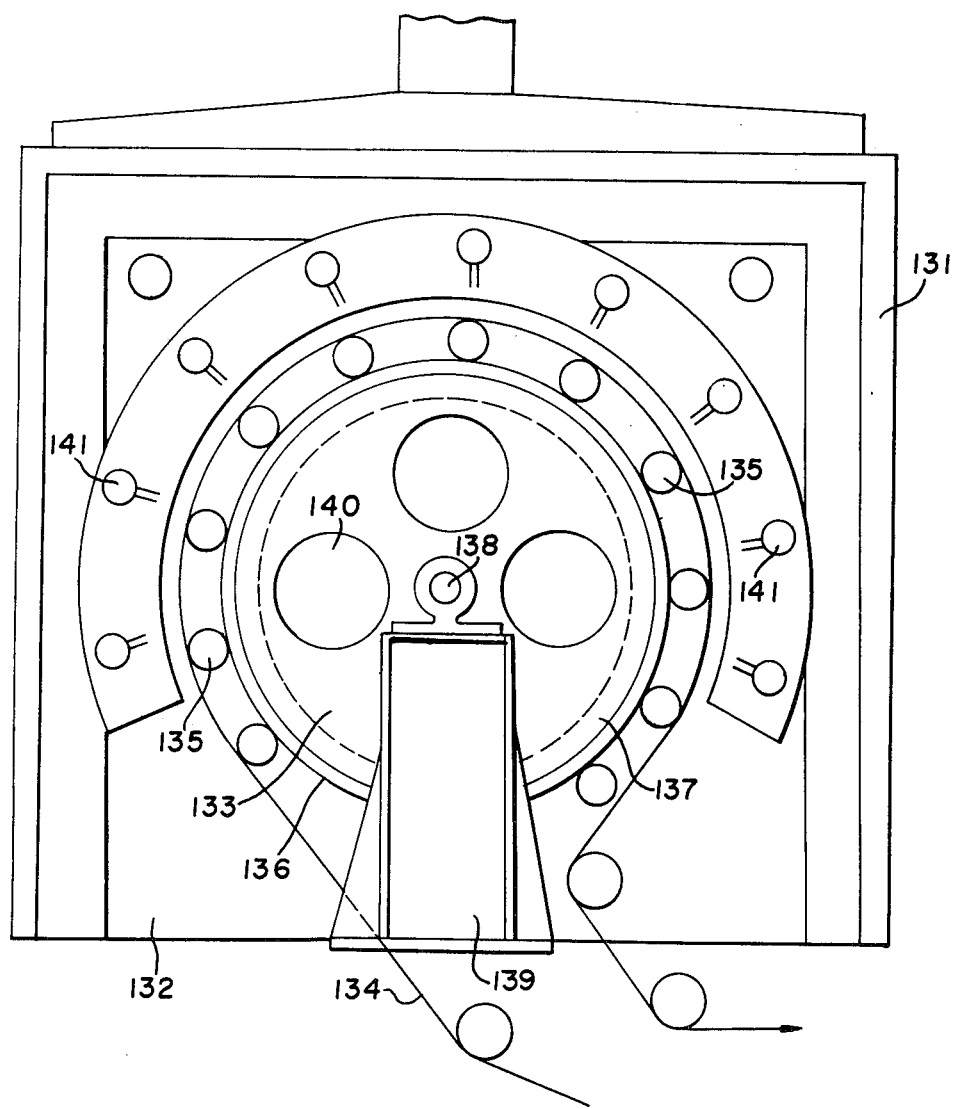
FIG. 4 is a schematic sectional front view of the other embodiment of a drying unit.

Referring to FIGS. 2 to 4, certain embodiments of the drying unit will be illustrated.

In FIGS. 2 and 3, the reference 102 designates a drying chamber; 101 designates an outer wall. It is preferable to incorporate a heat insulating material such as asbestos, glass fiber in the outer wall for increasing heat insulating effect from the viewpoint of a control of heat radiation. The reference 103 designates a rotary drum for running the sheet; 105 designates a surface of the rotary drum 103; 106 designates a coolant path for cooling the surface 105 of the rotary drum with a coolant such as water; 107 designates a coolant inlet to the coolant path 106; 108 designates a coolant outlet. The rotary drum 103 is held on the bearing 109 on the holder 110.

The sheet 104 is run by the rotation of the rotary drum 103. The hot air path 111 is formed in the rotary drum 103. The reference 112 designates nozzles for blowing hot air to the adhesive coated surface of the sheet 104. The number of the nozzles 112 can be selected depending upon the needs. The reference 113 designates hot air chamber and the hot air is fed from the hot air chamber through the nozzles 112 to the coated surface of the sheet 104 on the surface 105 of the rotary drum to remove water or the organic solvent in the adhesive composition. The reference 114 designates a hot air inlet disposed on the outer wall 101; and 115 designates a hot air outlet. The positions of the inlet 114 and the outlet 115 can be selected as desired. The reference 116 designates a thermometer for measuring the temperature in the chamber 102. Each blowing angle adjuster can be connected to each nozzle 112 and the angle of the hot air blowing can be controlled as desired, by turning the blowing angle adjuster.

The other embodiment of the drying unit will be illustrated referring to FIG. 4 wherein the reference 131 designates an outer wall for forming a drying chamber 132. The reference 133 designates a rotary drum for running the sheet 134 through guide rollers 135 which can be usual guide rollers, rubber coated guide rollers. It is possible to have a structure for passing a coolant such as water in the rollers for cooling the sheet. The number of the guide rollers 135 can be selected as desired, to prevent the contact of the sheet 134 on the surface 136 of the rotary drum. The reference 137 designates a coolant path for cooling the surface 136 with a coolant such as water.

The rotary drum 133 is held by the bearings 38 on the holder 139. The sheet 134 is run depending upon the rotation of the guide rollers 135 contacted with the rotary drum 133. The reference 140 designates air path in the rotary drum 133.

The reference 141 designates nozzles for blowing hot air to the adhesive coated surface of the sheet 134. The number of the nozzles can be selected as desired. The hot air blown through the nozzles 141 is contacted with the adhesive composition coated on the sheet 134 running depending upon the rotation of the guide rollers 135 and the rotary drum 133, whereby water or the organic solvent in the adhesive composition is removed.

The blowing angle adjuster can be connected to each nozzle 141 to select the angle of the hot air by turning the blowing angle adjuster.

In accordance with the embodiment of the drying unit, the back surface of the sheet is cooled and the adhesive coated surface of the sheet is contacted with the hot air to remove water or the organic solvent. Accordingly, the temperature of the sheet itself is controlled in lower degree to prevent the trouble of heat shrinkage, even though the sheet is heat shrinkable. Accordingly, the resulting multi-laminated sheet has no creases and a loss of the product is lowered.

Enough volume of hot air having high temperature can be applied under cooling the sheet from the back surface, whereby the adhesive strength can be high and the smell of the adhesive composition is not remained in the product.

In the latter embodiment, the contact area between the sheet and the guide rollers is remarkably small whereby the heat shrinkage can be further lowered to prevent the formation of creases in the multi-laminated sheet.

In the other embodiment, the rotary drum can be substituted with a plurality of guide rollers equipped with each coolant recycling mechanism so as to cool the guide rollers with a coolant such as water. The sheet is run by the rotation of the cooled guide rollers which are arranged to face the adhesive coated surface of the sheet to the hot air nozzles.

In the other embodiment, the superposing unit is combined in the drying chamber so as to superpose and to adhere the second sheet to the first sheet under pressure. The adhesive coated surface of the first sheet is dried and superposed to the second sheet in the drying chamber between the nip rollers which can be cooled with a coolant if desired.

The rotary drum in the drying unit can be also substituted with rotary guide rollers which are cooled with a coolant, or the rotary guide rollers rotated by contacting with the rotary drum cooled with a coolant.

What is claimed is:

1. An apparatus for preparing a multi-laminated sheet which comprises:

a first sheet feeding unit, a drying unit operably associated with said first feeding unit, a second sheet feeding unit, a superposing unit operably associated with said second feeding unit and said drying unit, a molten film extruding unit, a press-bonding unit operably associated with said film extruding unit and take-up winding unit operably associated with said press-bonding unit, said units being selectively rearrangeable;

wherein said drying unit comprises a rotary drum, a plurality of hot air nozzles for facing an adhesive coated surface of the first sheet displaced circumferentially adjacent to said rotary drum and means for cooling said rotary drum and wherein;

said drying unit further comprises a plurality of rotary guide rollers and a coolant recycling mechanism for each of said rotary guide rollers.

2. An apparatus for preaparing a multi-laminated sheet which comprises:

a first sheet feeding unit, a drying unit operably associated with said first feeding unit, a second sheet feeding unit, a superposing unit operably associated with said second feeding unit and said drying unit, a molten film extruding unit, a press-bonding unit operably associated with said film extruding unit and a take-up winding unit operably associated with said press-bonding unit, said units being selectively rearrangeable;

wherein said drying unit comprises a rotary drum, a plurality of hot air nozzles for facing an adhesive coated surface of the first sheet displaced circumferentially adjacent to said rotary drum and means for cooling said rotary drum and wherein;

said drying unit further comprises a plurality of rotary guide rollers contacted with the surface of said rotary drum for preventing contact of the first sheet on a surface of said rotary drum.

3. An apparatus according to claim 2, wherein; said guide rollers are rubber coated.

4. An apparatus according to claim 2, which further comprises: means for providing air flow in said rotary drum.

* * * * *